(12) United States Patent
Jenkins

(10) Patent No.: US 11,744,233 B2
(45) Date of Patent: Sep. 5, 2023

(54) POLLEN FEEDING SYSTEM FOR BEES

(71) Applicant: Michael J. Jenkins, Foristell, MO (US)

(72) Inventor: Michael J. Jenkins, Foristell, MO (US)

( * ) Notice: Subject to any disclaimer, the term of this patent is extended or adjusted under 35 U.S.C. 154(b) by 133 days.

(21) Appl. No.: 17/132,835

(22) Filed: Dec. 23, 2020

(65) Prior Publication Data

US 2021/0204526 A1    Jul. 8, 2021

Related U.S. Application Data

(60) Provisional application No. 62/956,967, filed on Jan. 3, 2020.

(51) Int. Cl.
*A01K 53/00*        (2006.01)
*B65D 43/02*        (2006.01)
*A23K 50/90*        (2016.01)

(52) U.S. Cl.
CPC .............. *A01K 53/00* (2013.01); *A23K 50/90* (2016.05); *B65D 43/0202* (2013.01)

(58) Field of Classification Search
CPC ................................ A01K 53/00; A01K 39/04
USPC ..................................... 449/48; 119/51.5, 77
See application file for complete search history.

(56) References Cited

U.S. PATENT DOCUMENTS

| | | | | |
|---|---|---|---|---|
| 1,566,571 A * | 12/1925 | Appleton | ............. | A01K 39/026 119/77 |
| 1,801,932 A * | 4/1931 | Miller | ................. | A01K 39/026 119/77 |
| 2,298,398 A * | 10/1942 | Marshaus | .............. | A01K 39/04 119/51.5 |
| 2,715,386 A * | 8/1955 | Jones | ..................... | A01K 39/04 119/51.5 |
| 3,301,220 A * | 1/1967 | Queen | ................ | A01K 39/0206 119/77 |
| 3,811,412 A * | 5/1974 | Murto | ................ | A01K 39/0125 D30/128 |
| 5,423,291 A * | 6/1995 | Daugherty | ........... | A01K 39/012 119/52.2 |
| D372,562 S * | 8/1996 | Brown | ........................ | D30/121 |
| 5,829,384 A * | 11/1998 | Landry | ............. | A01K 39/0113 119/52.3 |
| D427,732 S * | 7/2000 | Corletta | ........................ | D30/123 |
| 7,124,706 B2 * | 10/2006 | Tokas | ..................... | A01K 47/00 119/51.01 |
| 7,409,922 B1 * | 8/2008 | Baynard | .............. | A01K 39/012 119/52.3 |
| 7,530,330 B1 * | 5/2009 | Valle | ..................... | A01K 39/04 119/51.5 |

(Continued)

FOREIGN PATENT DOCUMENTS

FR    434427 A *  2/1912  ............ A01K 53/00

*Primary Examiner* — Joshua J Michener
*Assistant Examiner* — Henry Hooper Mudd
(74) *Attorney, Agent, or Firm* — Spencer Fane LLP

(57) ABSTRACT

A cover assembly for covering a container of pollen substitute comprises a lid member for engaging the container of pollen substitute. The lid member has an opening for bees to access the container contents and a removable cap element covers the lid member opening to divert water from entering the lid member opening while leaving a gap for bees to enter between the cap element and the lid member. A combination nectar feeder and pollen feeder is also provided. The cover assembly may be configured with ornamental shapes to approximate the design of a flower.

6 Claims, 15 Drawing Sheets

(56) References Cited

U.S. PATENT DOCUMENTS

| | | | | |
|---|---|---|---|---|
| 8,191,508 | B2* | 6/2012 | Greenwood | A01K 39/012 |
| | | | | 119/52.2 |
| 8,893,660 | B1* | 11/2014 | Al-Azemi | A01K 53/00 |
| | | | | 119/72 |
| 10,617,100 | B1* | 4/2020 | Larsen | B65D 25/2802 |
| 11,109,575 | B2* | 9/2021 | Stamets | A01K 53/00 |
| 2014/0004770 | A1* | 1/2014 | Nenninger | A01K 47/06 |
| | | | | 449/19 |
| 2016/0309680 | A1* | 10/2016 | Blohm | A01K 39/02 |
| 2019/0098875 | A1* | 4/2019 | McFerrin | A01K 39/01 |
| 2019/0274288 | A1* | 9/2019 | Cargill | A01K 53/00 |

* cited by examiner

POLLEN FEEDING SYSTEM FOR BEES

CROSS-REFERENCE TO RELATED APPLICATIONS

The present non-provisional patent application claims priority of an earlier-filed provisional patent application titled ACCESS LID FOR BEE POLLEN CONTAINERS, Application Ser. No. 62/956,967, filed Jan. 3, 2020. The contents of the identified earlier-filed application is hereby incorporated by reference in its entirety.

BACKGROUND

1. Field of the Disclosed Subject Matter

The present invention relates to a system for providing pollen substitute and liquid supplements, such as nectar and sugar water, for bees.

2. Background

For a colony of bees to thrive and produce abundant quantities of honey, accessible natural foliage is necessary. Honey bees collect pollen and nectar from natural foliage as food for their colony, which in turn is used to produce honey. If there is insufficient foliage in the vicinity of the beehive, it may be necessary for beekeepers and bee enthusiasts to provide pollen substitute and a source of nectar or sugar water. One form of pollen substitute comprises a powder that is stored in a container that can be left open out in the field for bees to access. Nectar and other liquid supplements can also be provide in containers out in the field.

Generally, the containers holding the pollen substitute that are commercially provided in bulk have a removable lid which is removed in order for the bees to gain access to the container and its contents. While the pollen substitute container is left open, with the lid removed, the contents are exposed and, undesirably, rain or other elements can mix in with the substitute pollen. If one wishes to keep the pollen substitute dry in the container as it is left out in the field, they must be mindful of any possible rain and act to replace the lid before any moisture enters the container. This presents an inefficient scenario and burdens the beekeeper to constantly monitor the pollen substitute container and cover it as necessary to keep the pollen dry.

It would therefore be desirable to provide a lid for pollen substitute containers that provides an adequate opening to the container contents at all times even while the lid is attached to the container. This would avoid having to constantly remove and replace the lid in order to make the contents accessible to bees. It would be desirable that such a lid protect the pollen substitute contents within the container from rain, yet provide an adequate opening by which bees can enter and exit the container while the lid is on.

For bee enthusiasts and the general population who wish to support the bee population and enjoy watching bee activity, it would be further desirable to provide a container for providing both a liquid supplement and a pollen supply for attracting and feeding bees. It would also be desirable to make such a container decorative in appearance to appeal to homeowners and the general population.

SUMMARY

The present invention comprises a system for providing a source of pollen and nectar for feeding bees from a container having a cover that permits access to the pollen container contents while the cover is attached to the pollen container. In one embodiment, a cover assembly is adapted for placement on a container in which pollen substitute is provided. The cover assembly is adapted for placement on the top circular rim of a cylindrical container in which the pollen substitute is stored. The cover assembly can be configured with an appropriate dimension to accommodate containers of different sizes and corresponding circumferences.

The cover assembly comprises a lid member having an upper surface contour that promotes the drainage of water. The upper surface contour of the lid member may be convex shaped. An underneath surface of the cover assembly has a configuration to receive the top circular portion of the container on which it is placed. Such configuration can comprise a channel that receives the edge of the top circular rim. Alternatively, the configuration can comprise an annular flange that can engage against the edge of the top circular portion of the container.

The cover assembly has an opening in the lid member to permit access of bees into the interior of the pollen substitute container. A cap element is provided over an upper surface of the lid. The cap element has a diameter dimension larger than the opening in the lid member. The cap element is supported apart from the upper surface of the lid member to provide a gap between the cap element and the upper surface of the lid member. This permits bees to crawl below the cap element to enter the access opening in the lid member.

The cover assembly may be provided with a climbing element that extends downwardly into the pollen substitute container to permit bees to use to climb back out from within the container. The climbing element can comprise different configurations. The cover assembly may be configured to approximate particular shapes, such as flower heads, to provide ornamental features. Similarly, the cover assembly can have particular colors or designs to make the pollen substitute container more decorative.

In another embodiment, the feeder comprises a combination nectar reservoir and pollen container. The nectar reservoir comprises a bottle member for containing liquid and a cover assembly for containing pollen substitute adapted for connection to the bottle member. The bottle member containing the liquid comprises a spout portion through which the liquid contents flow when the bottle member is inverted for dispensing for consumption by the bees. A dispensing tray connects to the spout portion and collects the liquid that flows out of the liquid container. Bees can tend to congregate in mass numbers to feed on the dispensed liquid and in doing so can pack tightly together which can cause them to drown under the crush of bee bodies. To restrict the area of access to the dispensed liquid and limit overcrowding, the dispensing tray is configured with a series of channels of narrow dimension to limit the accessible space for liquid feeding and minimize bee deaths.

The feeder can be provided with a compartment assembly for receiving a supply of pollen substitute. In this arrangement, a supply of pollen substitute from a larger source can be portioned out into the compartment. A removable lid member is provided to cover the compartment to keep its contents dry. The compartment is provided with a series of apertures along its periphery to permit access of bees into the interior of the compartment assembly to feed on the pollen. The lid member attaches to the compartment assembly in a manner to extend over the apertures yet leave a gap to permit bees to crawl into the apertures in the compartment assembly. The compartment and lid member can be decoratively configured such as to present the appearance of a flower.

In a further embodiment, the feeder comprises a system comprising a combination of a liquid feeder and pollen feeders that may be assembled in combination or used as separate components. In particular, a smaller capacity pollen feeder container is adapted for connection to the liquid feeder to present a combination liquid feeder and pollen feeder. A support element is provided for supporting the combination liquid feeder and pollen feeder at elevation over a surface, such as the ground. A separate pollen container having a larger capacity is provided for engagement with the support element if it is desired just to use the pollen feeder without the liquid feeder. A cover assembly is adapted for interchangeable attachment to the smaller capacity pollen container or the larger capacity pollen container. In this manner, the combination of the liquid feeder and pollen containers may be sold as a kit.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

BRIEF DESCRIPTION OF THE DRAWINGS

The drawings constitute a part of this specification and include exemplary embodiments of the disclosed subject matter and illustrate various objects and features thereof.

DETAILED DESCRIPTION

An embodiment of the invention comprises a cover assembly for placement over a container of bee pollen substitute. One version of the cover assembly can be sized and adapted for placement over the top rim of a bucket in which pollen substitute is commercially provided. A preferred embodiment of the cover assembly is for use with a separate container in which an amount of bee pollen substitute is placed.

Figure 1:
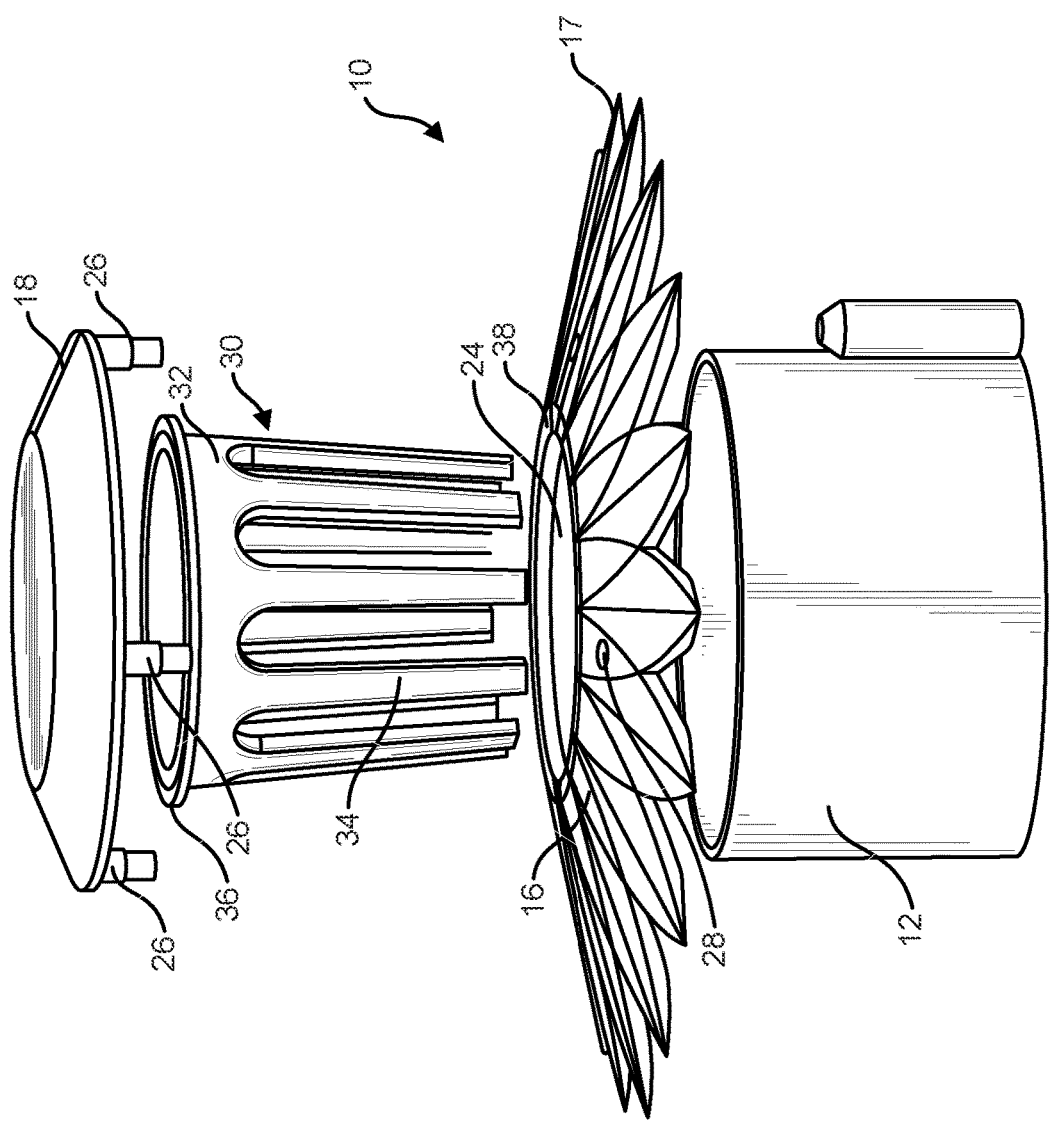
FIG. 1 is an exploded view of the access lid assembly.
Figure 2:
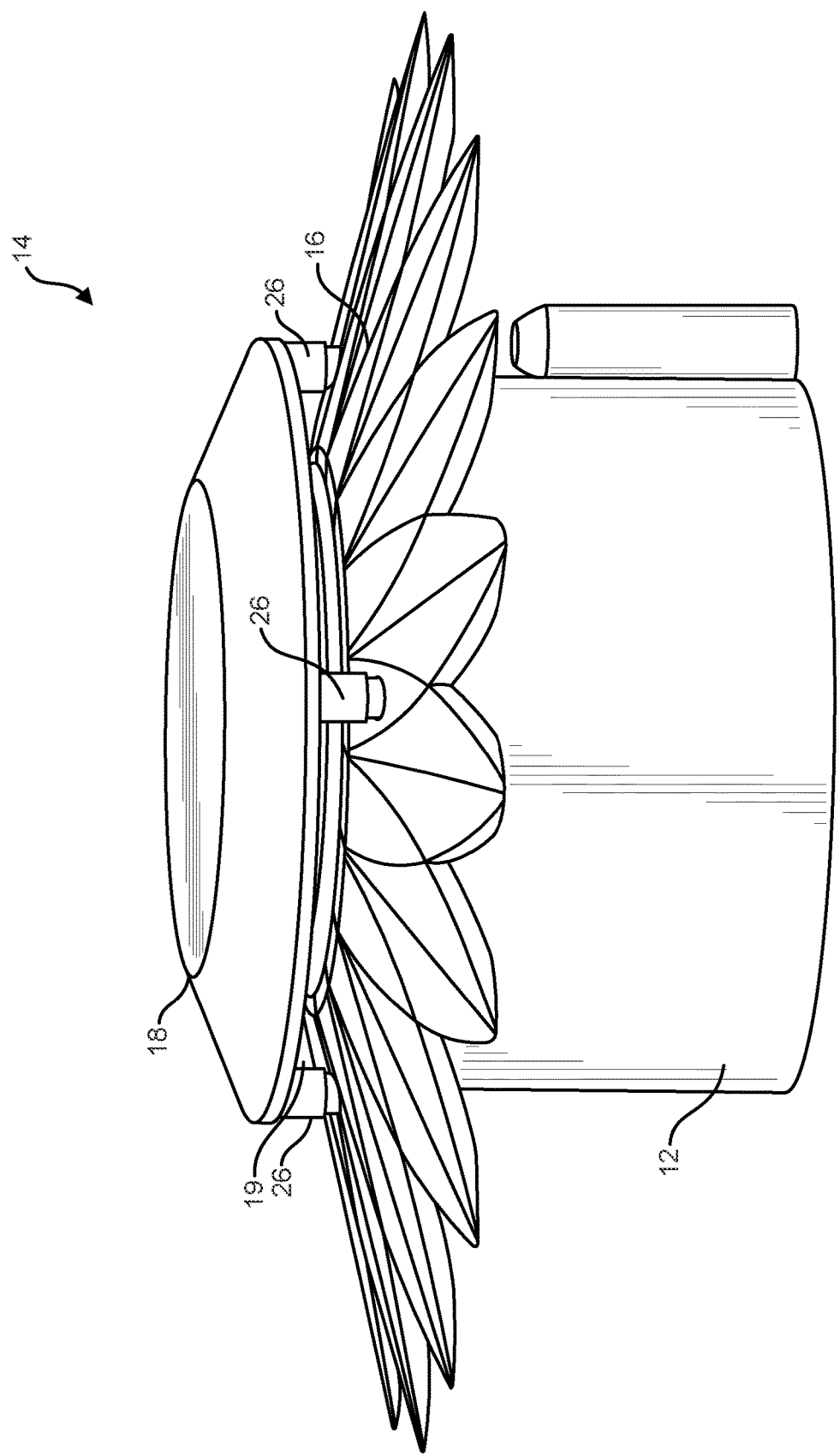
FIG. 2 is a view in side elevation of the access lid assembly.
Figure 3:
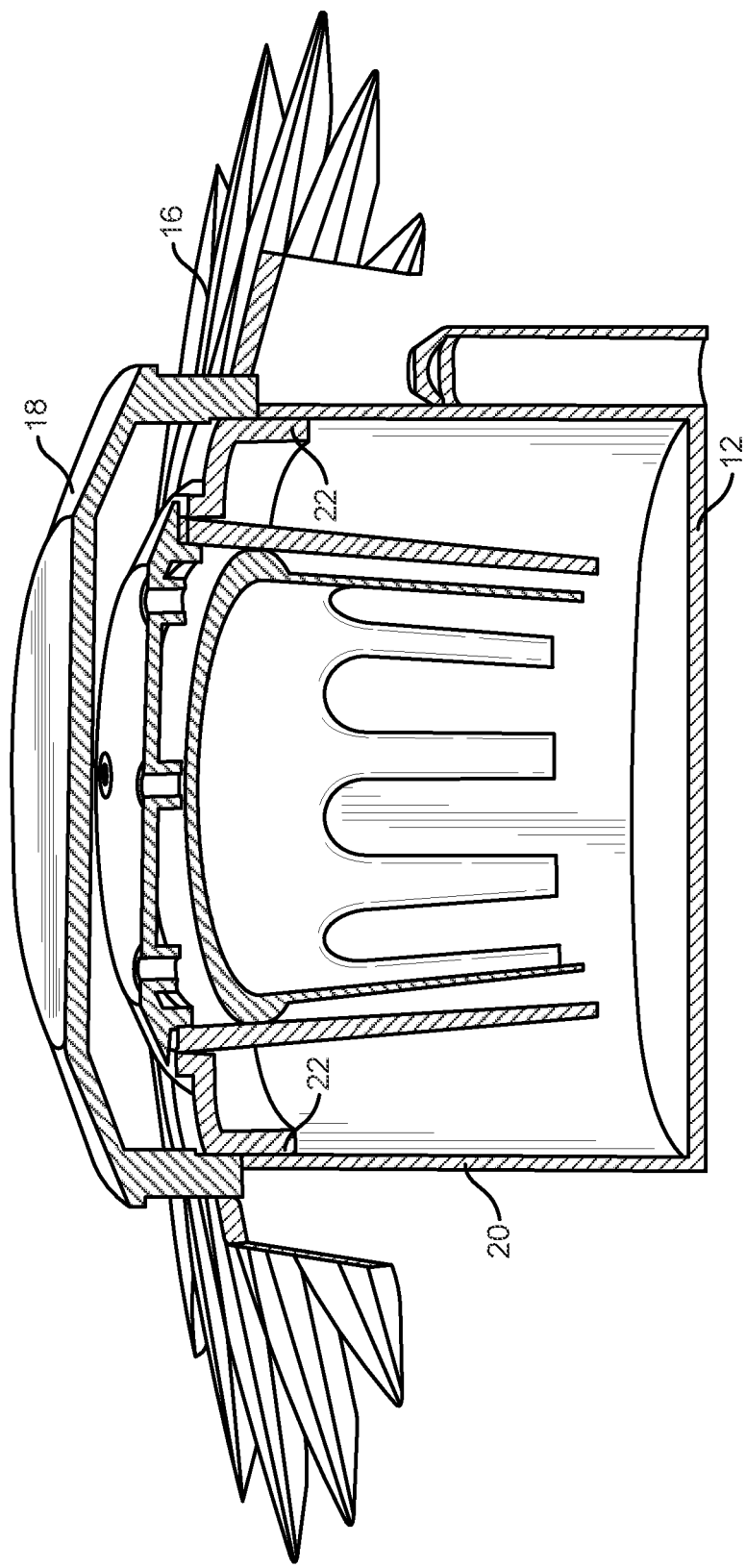
FIG. 3 is a cross-sectional view in side elevation of the access lid assembly.
Figure 4:
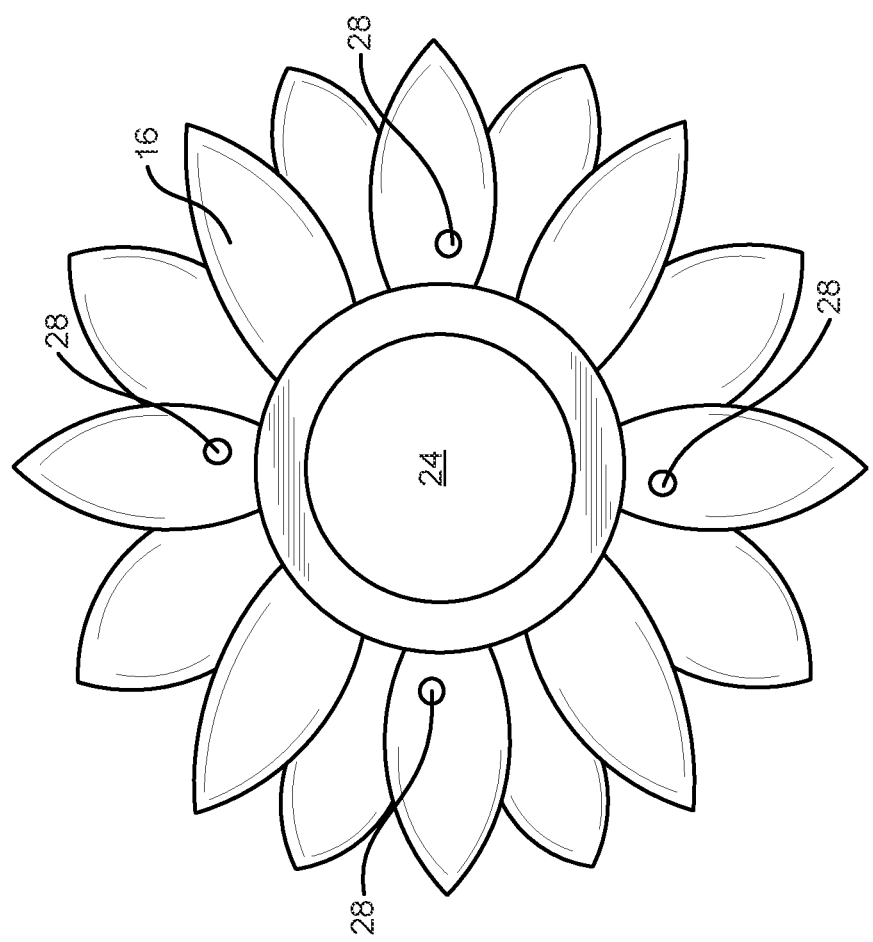
FIG. 4 is a top plan view of the access lid assembly with the cap member removed.
Figure 5:
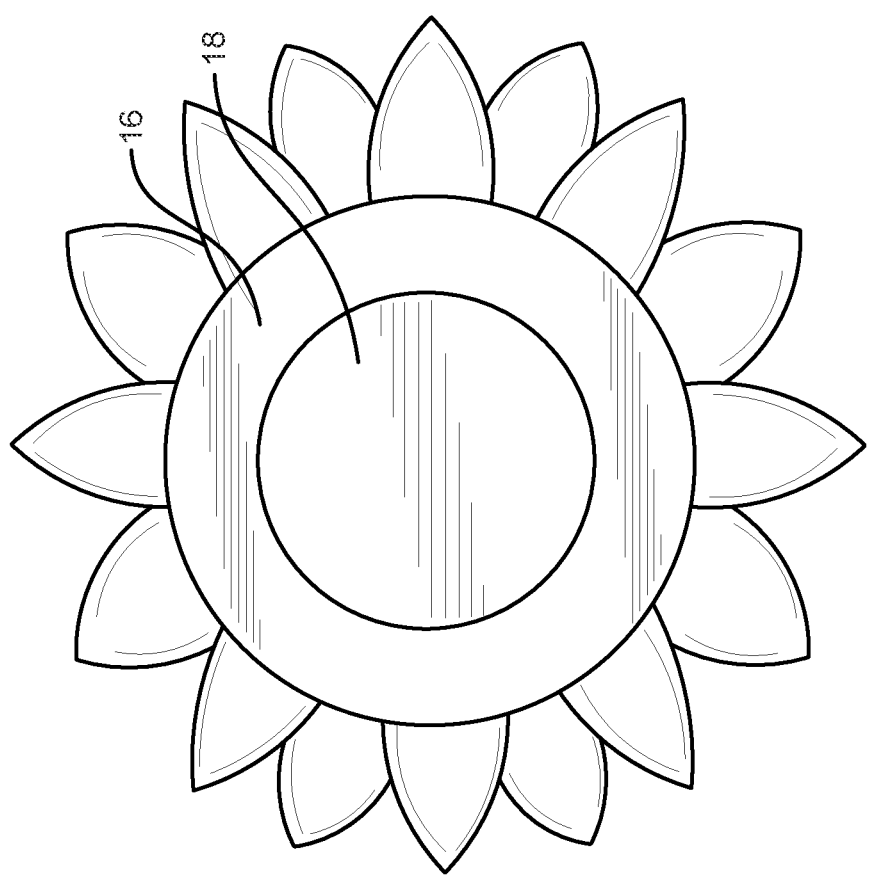
FIG. 5 is a top plan view of the access lid assembly with the cap member attached.

Referring to the drawings, FIGS. 1-3 show an embodiment of a container assembly 10 for receiving a supply of bee pollen substitute. A cylindrical container 12 is provided for holding a quantity of bee pollen. Cover assembly 14 is adapted for placement over cylindrical container 12 and keeps falling moisture, such as rain, from entering the container and keeps the bee pollen contents dry. The cover assembly also helps to keep wind from blowing away the pollen contents. Cover assembly 14 comprises a lid member 16 and a cap member 18. When cover assembly 14 is placed on container 12, lid member 16 rests on top of container wall 20 as shown in FIG. 3. A bottom surface of lid member 16 defines an annular flange 22 which engages against container wall 20 to hold lid member 16 in place. Lid member 16 has an outer periphery 17 of expanded diameter to cover and protect the contents of container 12. Lid member 16 has an opening 24 as shown in FIG. 4 which provides access to the interior of container 12 when cover assembly 14 is in place on container 12.

Cap member 18 is removably received on top of lid member 16. A series of legs 26 are formed on the underneath side of cap member 18 as shown in FIG. 1. Lid member 16 has corresponding apertures or sockets 28 for receiving legs 26 of cap member 18. Legs 26 enable cap member 18 to be spaced apart from a top surface of lid member 16 to create a gap 19 therebetween as shown in FIG. 2. This gap enables bees to enter underneath cap member 18 and then enter the interior of container 12 through opening 24 in lid member 16 when the cover assembly 14 is engaged with container 12. The top exterior surfaces of lid member 16 and cap member 18 are slanted downwardly to divert falling water from pooling on top of cover assembly 14.

Cover assembly 14 may be provided with a downwardly depending climbing element 30 to enable bees to crawl back up from the interior of container 12 after feeding on the pollen contents. Climbing element 30 comprises a cylindrical body 32 having a series of finger elements 34 which bees can cling to and climb on to crawl back out from the interior of container 12. A flange 36 is provided on the upper perimeter of climbing element 30 to support the climbing element on edge 38 of opening 24 in lid member 16 as shown in FIG. 1. The climbing element can have different configurations and any element that provides a climbing surface by which bees can access to exit the container will suffice.

Figure 6:
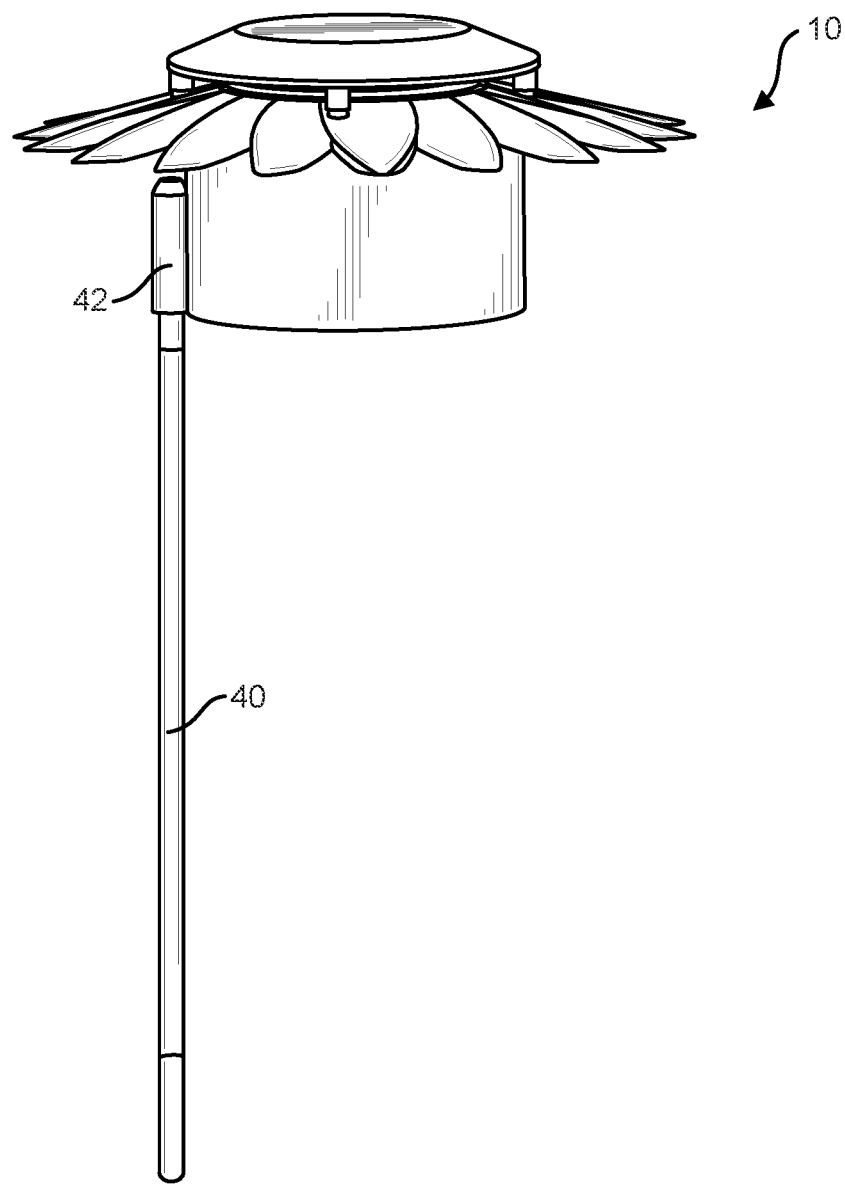
FIG. 6 is a perspective view of another embodiment of the access lid assembly.
Figure 7:
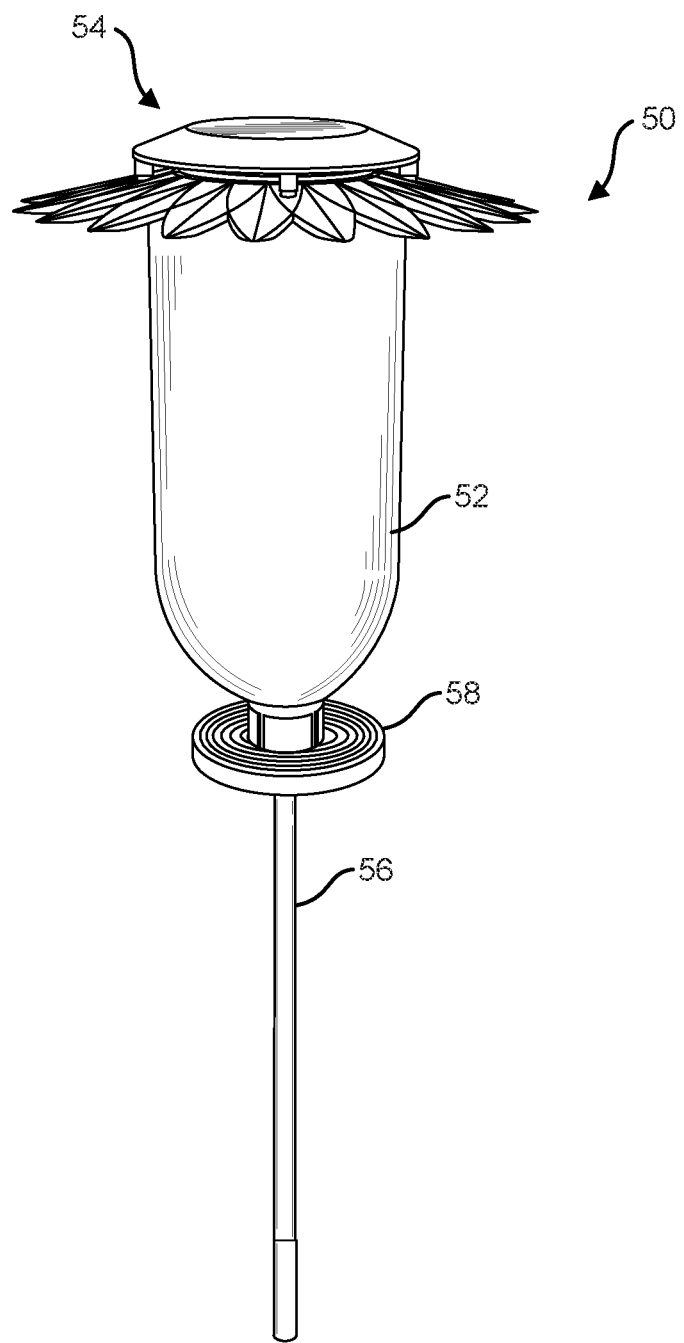
FIG. 7 is a perspective view of the combination liquid and pollen feeder.

The components of cover assembly 14 can be manufactured by 3-D printing which permits a substantial amount of creativity in designing the shapes of the lid member and cap member. In particular, cover assembly may be constructed to approximate the shape of a flower, with the outer periphery 17 of lid member 16 being configured in the shape of petals and the cap member 18 being configured as the central portion of a sunflower as shown in FIG. 7. Container assembly 10 can be supported in a raised position on the ground using support element 40 as seen in FIG. 6. A sleeve 42 is mounted on the side of container 12 to receive an end of support element 40. Sleeve 42 may alternately be mounted on an underneath side of container 12.

In another embodiment, a combination liquid and pollen feeder 50 is provided as shown in FIG. 7. The liquid can be nectar or any other source of sugar water. Combination feeder 50 is comprised of liquid feeder 52 and pollen feeder 54. Pollen feeder 54 is stacked on top of liquid feeder 52 in a vertical arrangement and together they are supported in a raised elevation on a surface (such as the ground) by support element 56. A dispensing tray 58 is placed in fluid communication with liquid feeder 52 for receiving the liquid therefrom.

Figure 8:
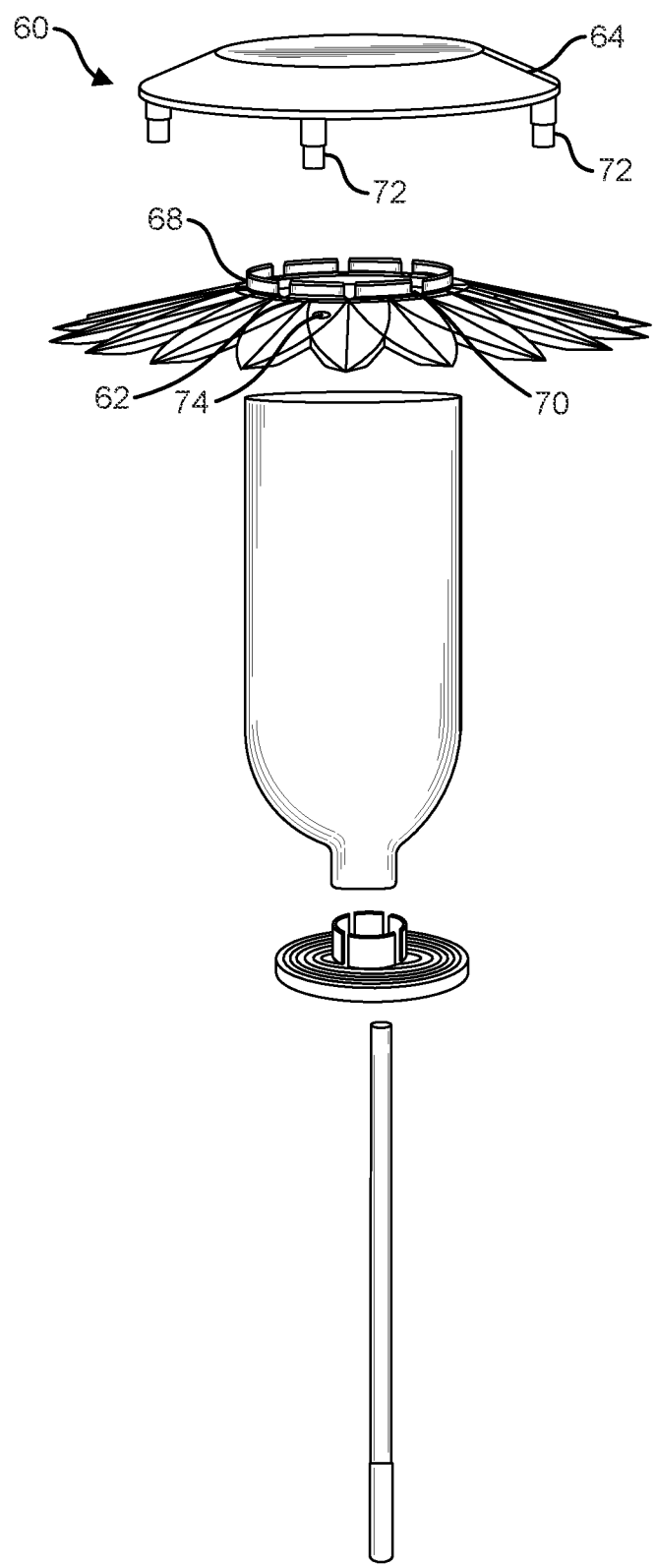
FIG. 8 is an exploded view of the combination liquid and pollen feeder.
Figure 9:
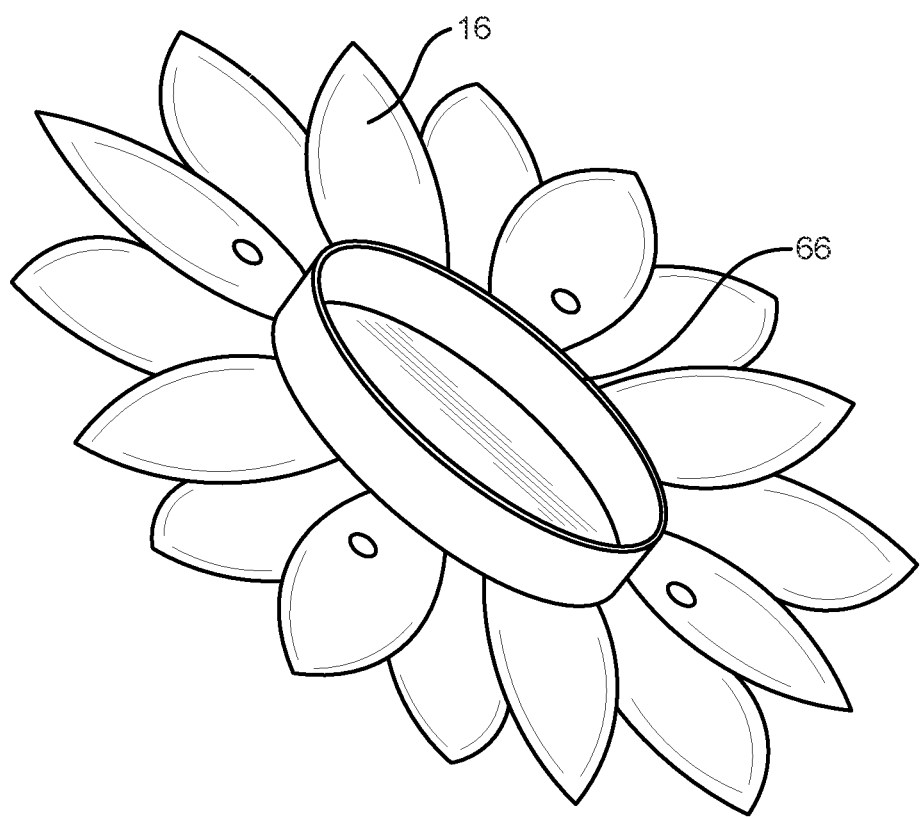
FIG. 9 is a perspective view of the underneath side of the pollen feeder component of the combination liquid and pollen feeder.
Figure 10:
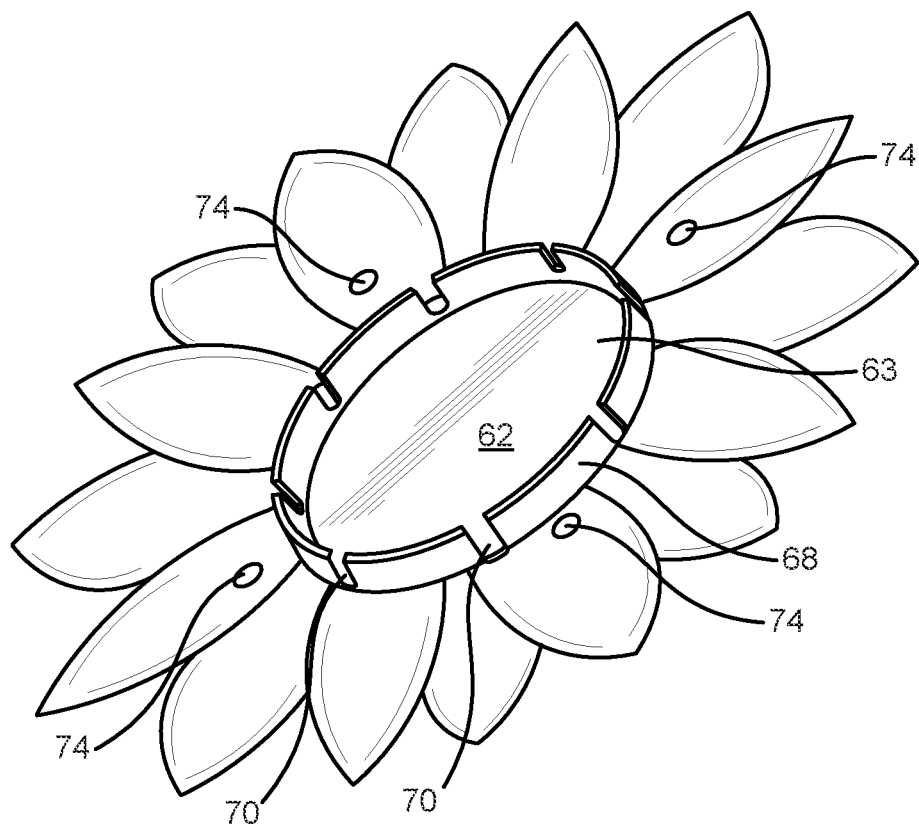
FIG. 10 is a perspective view of the upper side of the storage container of the pollen feeder component of the combination liquid and pollen feeder.
Figure 11:
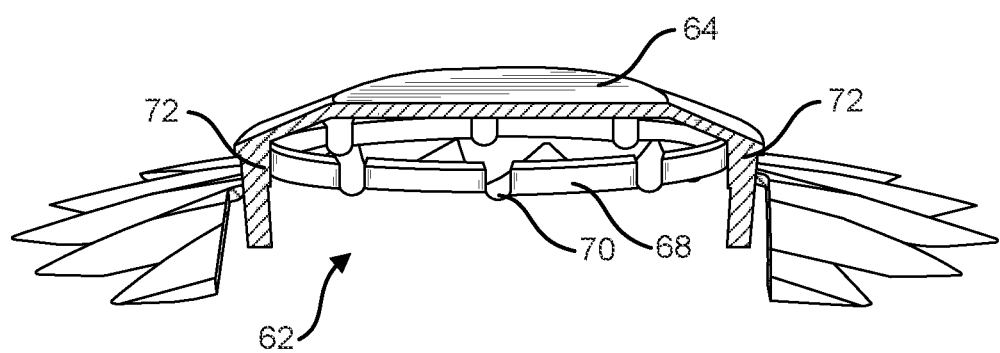
FIG. 11 is a cross-sectional view of the storage container of the pollen feeder.
Figure 12:
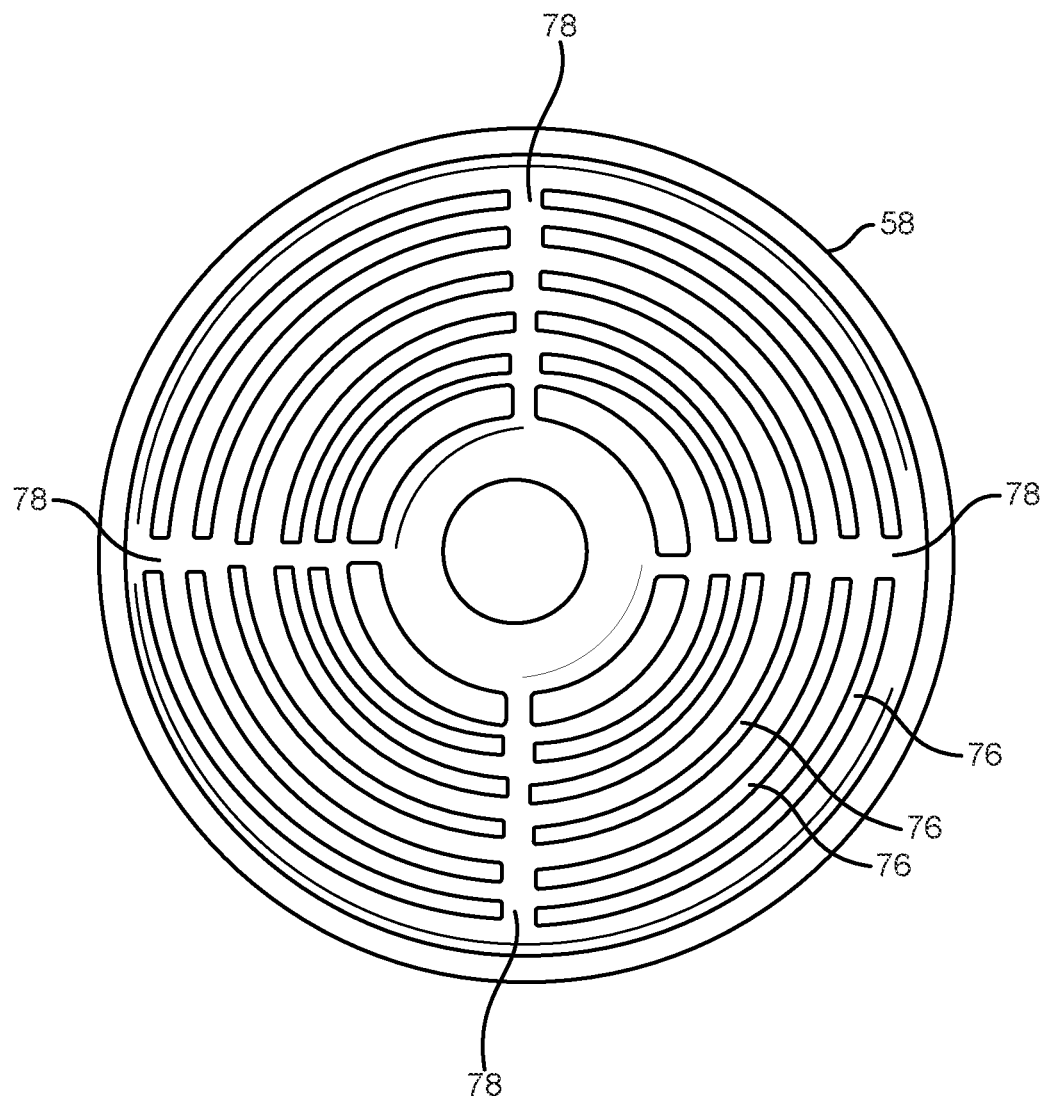
FIG. 12 is a top plan view of the dispensing tray for the liquid feeder.
Figure 13:
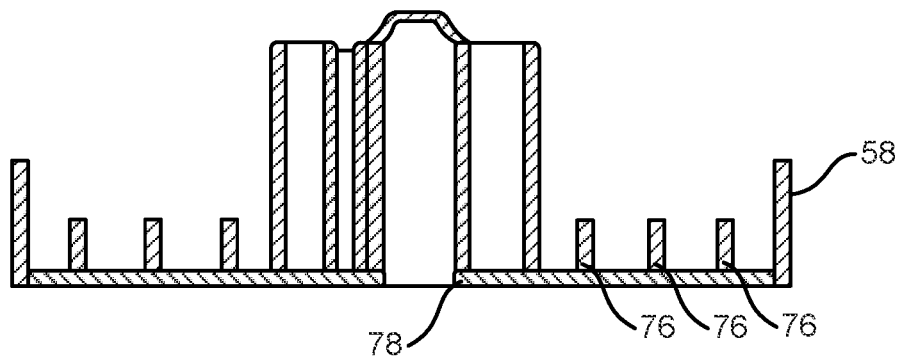
FIG. 13 is a cross-sectional view of the dispensing tray for the liquid feeder.

Pollen feeder 54 comprises container assembly 60 having a storage container 62 and a lid member 64 as shown in FIG. 8. In this embodiment, storage container 62 has a relatively shallow profile and relatively small storage capacity. Storage container 62 has an annular flange 66 on an underneath side thereof as shown in FIG. 9 which can engage the cylindrical end of liquid feeder 52 for connection of pollen feeder 54 to liquid feeder 52. As shown in FIG. 10, the upper side of storage container 62 has a raised circumferential wall 68. A plurality of apertures 70 are placed in wall 68 to provide access points for bees to enter into storage container 62. The pollen generally has a granular, powdery consistency and will not readily flow out of the apertures 70 and so is substantially retained within storage container 62 until consumed by bees. Storage container 62 may have a floor 63 for retaining the pollen contents. Alternatively, storage container 62 may be provided without a bottom floor and pollen may simply be placed on the end surface of liquid feeder 52 and then covered by pollen feeder 54 as shown in FIG. 7. Lid member 64 is removably received by storage container 62 to keep the stored pollen contents dry. A plurality of leg members 72 are provided on the underneath side of lid member 64 and are received in holes 74 in the top of storage container 62. The leg members 72 enable there to be a gap between lid member 64 and storage container 62 to permit bees to access apertures 70.

Dispensing tray 58 is in fluid communication with liquid feeder 52 and receives the liquid whereby bees can feed directly from the dispensing tray. Bees tend to crowd together excessively when feeding which presents a hazard of drowning to the bees under the crush of bodies. To help minimize the space in which bees might overcrowd, dispensing tray 58 is provided with a series of smaller-dimensioned channels 76 which limit the access area in which bees will consume the fluid. Furrows 78 permit the fluid to flow through to all of the channels. Channels 76 may be configured in a concentric arrangement.

Figure 14:
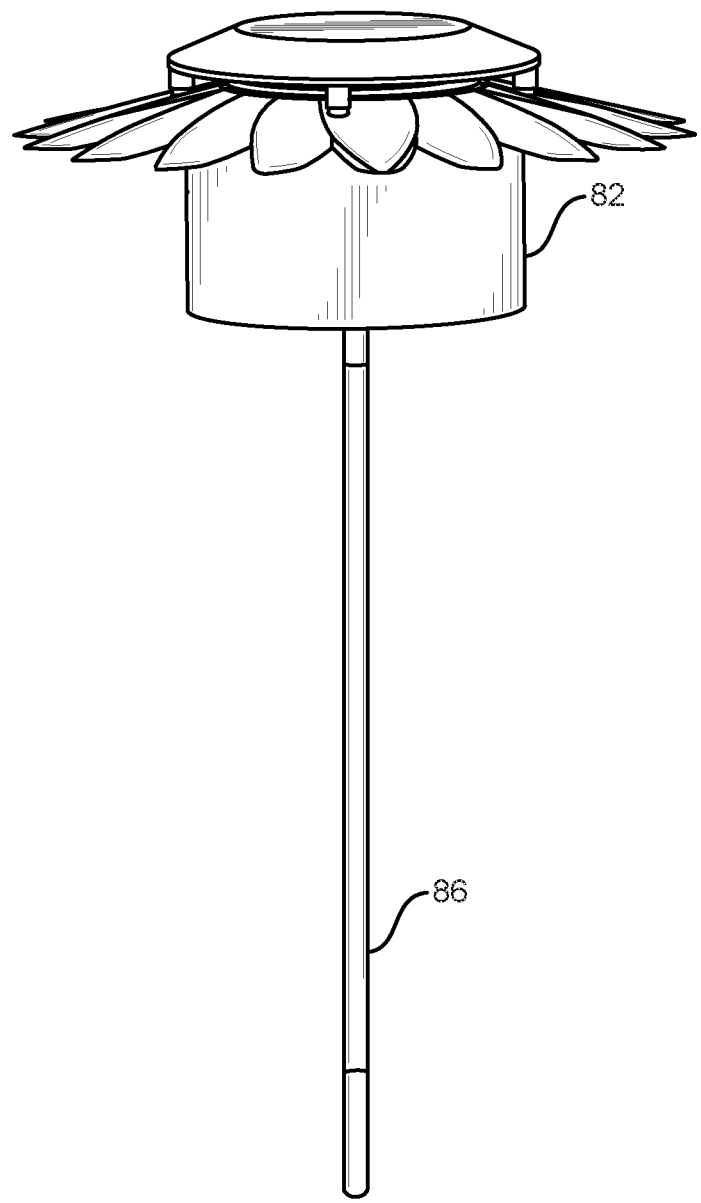
FIG. 14 is a perspective view of the pollen feeder attached to the support element.
Figure 15:
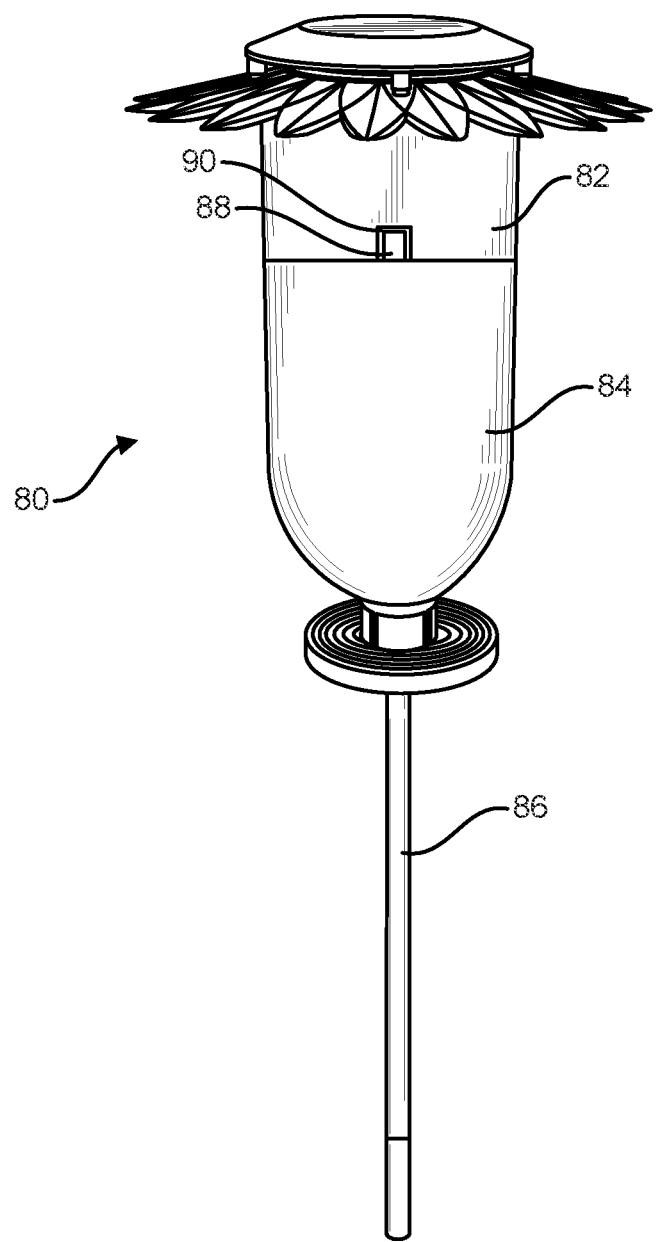
FIG. 15 is a cross-sectional view in side elevation of the combination liquid and pollen feeder.

In another embodiment, the combination liquid and pollen feeder 50 as shown FIG. 7 may alternatively comprise a full size pollen container 82 for connection to liquid feeder 84. As shown in FIG. 15, a support element 86 is provided to support liquid and pollen feeder 80 in elevation on a surface such as the ground. Pollen container 82 is similar in structure and function to container 12 and cover assembly 14 heretofore described and shown in FIGS. 1-3. In this embodiment, pollen container 82 is separable from liquid feeder 84. When separated, pollen container 82 receives support element 86 as shown in FIG. 14 for supporting pollen container 82 in elevation on the ground or other surface. Liquid feeder 84 may be provided with a peg member 88 at a top end thereof as shown in FIG. 15. The bottom end of pollen container 82 may be provided with a receptacle 90 for receiving peg member 88 when pollen container 82 is positioned on top of liquid feeder 84 to promote a secure engagement between pollen container 82 and liquid feeder 84. The corresponding dimensions of peg member 88 and receptacle 90 are approximately the same diameter as support element 86. When pollen container 82 is separated from liquid feeder 84 to stand independently therefrom as shown in FIG. 14, receptacle 90 receives the end of support element 86.

The components of the combination liquid feeder and pollen feeders can be provided as a kit for assembly into an integrated liquid and pollen feeder as shown in FIG. 7, and for separation of the components such that the pollen feeder can be used individually as shown in FIG. 14. When the liquid feed and pollen feeder are assembled together, the preferred embodiment comprises the storage container 62 having the shallow profile and smaller storage capacity. When the pollen feeder is used by itself, it is preferable to use the larger capacity pollen container 82. The support element is connectable to the liquid feeder and alternatively to the pollen container as heretofore described.

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Although the invention has been disclosed with reference to various particular embodiments, it is understood that equivalents may be employed and substitutions made herein without departing from the scope of the invention as recited in the claims.

Having described the disclosed subject matter, what is claimed as new and desired to be secured by Letters Patent is:

1. A feeding system for bees, the system comprising a liquid feeder portion and a pollen feeder portion, a liquid feeder comprising a container for storing liquid and a pollen feeder comprising a container for storing pollen, the liquid feeder container being in fluid communication with a dispensing tray, the pollen feeder container comprising a container assembly being adapted for connection to the liquid feeder container, the container assembly comprising a storage container and a lid member, the storage container having an outwardly extending skirt member, the lid member being removable from the storage container, the lid member having a slanted upper surface configuration to divert water from a top of the lid member, the storage container defining a wall having a plurality of apertures in a side of the wall and opening through a top edge of the wall to permit access by bees into the storage container, the skirt member receiving the lid member in a position to overhang the apertures and to provide a gap between the lid member and the skirt member at a width approximating a height dimension of the plurality of apertures.

2. The feeding system for bees according to claim 1 in which the liquid feeder and pollen feeder are oriented in vertical relationship with each other, with a spout member at a first end of the liquid feeder being oriented downwardly for dispensing liquid into the dispensing tray, the pollen feeder container being adapted for connection to a second end of the liquid feeder.

3. The feeding system for bees according to claim 2 in which the dispensing tray defines a plurality of channels for receiving the dispensed liquid.

4. The feeding system for bees according to claim 3 in which the channels are arrayed concentrically within the dispensing tray.

5. The feeding system for bees according to claim 1 in which the skirt member and lid member are configured in a shape of a flower face.

6. The feeding system according to claim 1 in which the feeding system further comprises a support stand for supporting the feeding system at an elevated level above a support surface.

\* \* \* \* \*